Figure 2:
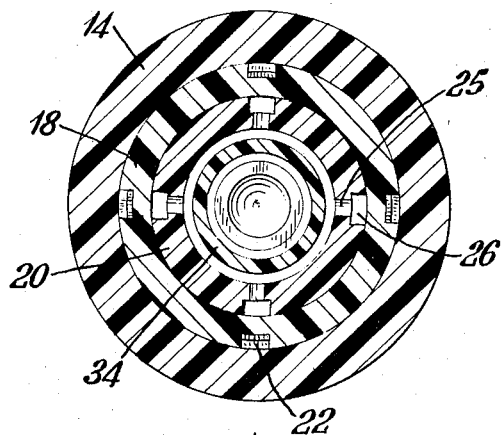

Dec. 19, 1967    L. J. ULINE ETAL    3,359,135
ELECTROCHEMICAL CELL AND LIQUID MIXTURE
SEPARATOR COMBINATION
Filed Dec. 23, 1963

INVENTORS
LAWRENCE J. ULINE
HELIO A. TRULL

BY *John R. Moriarty*

ATTORNEY

United States Patent Office 3,359,135
Patented Dec. 19, 1967

3,359,135
ELECTROCHEMICAL CELL AND LIQUID MIXTURE SEPARATOR COMBINATION
Lawrence J. Uline, Lakewood, Ohio, and Helio A. Trull, St. Petersburg, Fla., assignors to Union Carbide Corporation, a corporation of New York
Filed Dec. 23, 1963, Ser. No. 332,696
13 Claims. (Cl. 136—86)

This invention relates to the separation of a mixture composed of one or more fluids within a liquid, and particularly relates to a liquid mixture separator which is adapted to be installed at an outlet of a receptacle and which is capable of separating and removing one of the constituent liquids of a liquid mixture which collects within the receptacle.

Liquid mixtures may be prepared by bringing together two liquids which are immiscible, for instance, oil and water. Numerous chemical and physical processes are known in which liquid mixtures are produced continuously and collected within a receptacle such as a residue tank, and it is frequently desirable in such processes to separate the liquid mixture in a manner whereby a least one of the constituent liquids is continuously removed from the receptacle for treatment or use. Sometimes gas bubbles will also be included within the liquid mixture, or in a single liquid, and the removal of the gas from one of the liquid constituents may likewise be desirable.

One instance where these conditions are encountered is in the electrochemical art with electrochemical cells of the type which employ a highly electrically conductive liquid, such as mercury, as one electrode thereof, a liquid electrolyte, and another electrode of opposite polarity. An example of this type of electrochemical cell is a flowing mercury cathode-chlorine cell. More exemplary, however, is a recently developed primary electrochemical battery, now generally referred to as a sodium amalgam-oxygen fuel cell, which is capable of delivering electrical energy at high rates for continuous, protracted periods of time. A typical sodium amalgam-oxygen fuel cell battery is described and claimed in the co-pending application of E. A. Schumacher et al., Ser. No. 332,385, filed concurrently herewith, and consists of a multiplicity of primary electrochemical cells, each of which utilizes sodium in the form of a liquid sodium amalgam as the active anodic material.

In such a battery, the liquid amalgam is passed through each cell of the battery and is uniformly distributed over the surface of a steel sheet electrode as a falling film. A liquid electrolyte, for instance, an aqueous solution of sodium hydroxide, which is immiscible with amalgam, is continuously circulated through each cell countercurrently to the flow of liquid amalgam. An amalgam circulatory system continuously supplies liquid amalgam to the cells of the battery and removes the depleted amalgam which collects at the bottom of each cell container. The circulatory system, as described in the above-mentioned Schumacher et al. application, has sodium regenerator means whereby liquid sodium is introduced into the depleted amalgam to regenerate it into a usable amalgam again. An oxidant, such as oxygen, chlorine, bromine, and the like, is supplied simultaneously to a suitable cathode disposed nearby the anode.

Since the depleted amalgam in the bottom of the cell container is in intimate contact with the electrolyte and may include droplets of electrolyte as the amalgam collects, and since sodium is reactive with the liquid electrolyte, the electrolyte must be separated from the sodium amalgam before regeneration of the amalgam. In short, the depleted amalgam must be continuously withdrawn from each cell for circulation in the external system while the liquid electrolyte is prohibited from entering the circulatory system along with the amalgam. Similarly, any hydrogen evolved by wasteful erosion of the sodium in the amalgam should be removed from the amalgam before entry into the external system.

It is therefore an object of the invention to provide for the separation of a mixture which collects within a receptacle at a continuous and relatively steady rate, which mixture is composed of one or more fluids within a liquid.

Another object is to provide a liquid mixture separator which is adapted to be installed at an outlet of a receptacle and which is capable of separating and removing one of the constituent liquids of a liquid mixture which collects within the receptacle.

Still another object is to provide such a separator which is fully automatic and intermittently operable to pass the separated constituent liquid through an outlet of a receptacle solely in response to the accumulation of a predetermined quantity of liquid within the separator.

A further object is to provide such a separator which is single, rugged, easily installed, and readily assembled and disassembled for the purpose of maintenance.

For the sake of conciseness, the invention will be described in connection with an electrochemical cell of the type which employs a liquid anodic material, such as sodium amalgam, but it is to be understood that the separator of the invention can be used with other devices and processes.

Figure 1:
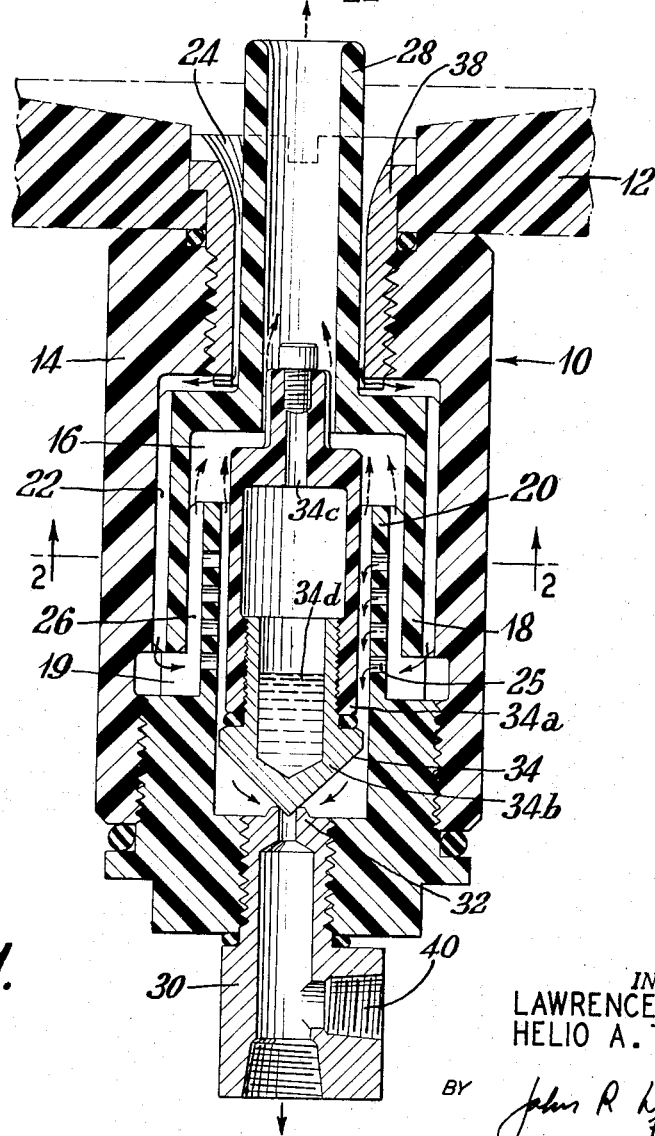

In the accompanying drawings:

FIG. 1 is a sectional view of an embodiment of the separator of the invention connected to the bottom of a fuel cell container; and FIG. 2 is a sectional view taken along line 2—2 of FIG. 1.

Broadly, the above objects are achieved by the provision of a separator for separating a mixture of at least one fluid in a liquid, the fluid and liquid being immiscible and having different specific gravities, which separator comprises a housing having a chamber therein with the bottom central portion of the chamber being the lowest part of the chamber, inlet and conduit means for introducing the mixture near the lateral circumference of the chamber, conduit means connected with the inlet and conduit means near the bottom of the chamber for causing the mixture to flow substantially horizontally and laminarly to the central portion of the chamber where the heavier component of the mixture settles to the bottom of the chamber and the lighter component flows to the top, a lighter liquid outlet means at the top of the chamber, a heavier liquid outlet means with an orifice seat therein at the bottom of the chamber, and a float in cooperative relationship with the orifice seat to maintain a predetermined amount of the heavier component of the mixture in the chamber. This separator construction may be easily made and may be readily attached to the bottom of a receptacle holding a mixture. Furthermore, this separator need not be large in size to separate a mixture of a fluid in a liquid, and this characteristic is important in applications in which space is critical, such as a fuel cell battery plant in a mobile vehicle.

A preferred embodiment of the separator of the invention comprises a housing having a chamber therein, a first sleeve disposed in the chamber from its top and extending almost to its bottom, and a second sleeve disposed in the chamber from its bottom and within the first sleeve and extending for a substantial distance toward the top of the chamber. Liquid inlet and conduit means is provided in the top of the housing and between the chamber wall and the first sleeve, and this inlet and conduit means connects at the bottom of the first sleeve with a horizontal flow conduit means which includes at least one hole in the second sleeve for causing the mixture to flow substantially horizontally and laminarly to the central portion of the chamber. An inner liquid conduit means is also preferably provided between the two sleeves from the horizontal flow conduit means to the top of the second sleeve to afford a path for the rising lighter liquid in addition to the central portion of the chamber. Thus, a mixture of a fluid in a liquid can enter the separator, flow down between the chamber wall and the first sleeve, and then flow substantially horizontally and laminarly to the central portion of the chamber where the heavier component settles and the lighter component rises to the top of the chamber.

The inner portion of the chamber includes a first liquid outlet means at its top, a second liquid outlet means having an orifice seat therein at its bottom, and a float disposed therein in cooperative relationship with the orifice seat. The construction separates a mixture of a fluid in a liquid since the flow pattern near the outlets is substantially laminar and non-turbulent and any substantial turbulence in the entering mixture is confined to places near the lateral periphery of the chamber away from the outlets. The float is adjusted so that only a predetermined amount of the collected heavier liquid will open it, thereby precluding any of the lighter liquid from exiting through the outlet means at the bottom of the chamber and effecting automatic operation. In the case of a liquid mixture of amalgam and electrolyte, the amalgam will exit through the bottom outlet and the electrolyte will exit through the top outlet.

Referring now to FIG. 1, which is a sectional view of a separator 10 of the invention connected to a fuel cell container 12, the separator 10 comprises a housing 14 having a chamber 16 wherein with a first sleeve 18 extending from the top of the chamber 16 almost to its bottom, thereby leaving a horizontal flow chamber 19 between the first sleeve 18 and the bottom of the chamber 16 at this point. A second sleeve 20 disposed within the first sleeve 18 extends from the bottom of the chamber 16 toward its top for a substantial distance, a distance at least above the bottom of the first sleeve. The lengths of the sleeves 18 and 20 are not particularly critical, but the bottom of the first sleeve 18 should be below the top of the second sleeve 20, preferably overlapping for a substantial distance, to minimize the possibility of turbulence near the wall of the chamber 16 reaching the central portion of the chamber 16.

A first liquid conduit means 22, which lies between the wall of the chamber 16 and the first sleeve 18, connects with a liqud inlet means 24 and extends to the bottom of the first sleeve 18 where it joins the horizontal flow chamber 19. A second liquid conduit means 26 communicates with the horizontal flow chamber 19 and extends up between the two sleeves 18 and 20 to the top of the second sleeve 20 where it communicates with the inner portion of the chamber 16. At least one orifice 25 drilled in the sleeve 20 connects the horizontal flow chamber 19 with the inner portion of the chamber 16 in a manner which provides substantially horizontal flow along this path. Thus, a liquid mixture can enter the housing 14 by the liquid inlet means 24, flow down the first liquid conduit means 22, and then to the chamber 16 in a substantially horizontal and laminar manner, thereby permitting the liquid mixture to separate in the chamber 16.

The first and second conduit means 22 and 26 may consist of one or more grooves in one or both of the sleeves 18 and 20, as better shown in FIG. 2, or they may consist of annular spaces caused by spacing the first sleeve 18 from the wall of the chamber 16 and the second sleeve 20 from the first sleeve 18. The horizontal flow chamber 19 may consist of small holes drilled in the first sleeve 18 near its bottom, or may consist of a space caused by the first sleeve 18 being short of the bottom of the chamber 16 at that point. Other modifications will be apparent to those in the art.

If the horizontal flow chamber 19 is long enough to keep turbulence near the lateral circumference of the chamber 16 from reaching the inner portion of the chamber 16, the sleeve 20 may be shortened to a point where the orifice 25 is unnecessary to provide substantially laminar flow, or the sleeve 20 may even be omitted entirely. The construction described above, however, is definitely preferred, especially when a small separator is desired.

At the top of the chamber 16 is a first liquid outlet means 28 which communicates with the inner portion of the chamber 16 within the first sleeve 18. As shown in FIG. 1, the liquid outlet means 28 and the first sleeve 18 can be made of one integral piece, which is convenient for assembly, but the invention is not limited to such a construction. Preferably, this outlet means 28 extends into the interior of the cell container 12 to a point above the level of the liquid mixture collected therein. This allows the electrolyte separated from the liquid mixture by forces of gravity to be returned to the main electrolyte body. The liquid outlet means 28, however, can also be connected to any system desired, especially when the separator of the invention is not attached directly to the receptacle holding the liquid mixture.

At the bottom of the chamber 16 is a second liquid outlet means 30 having an orifice seat 32 therein. A metal fitting screwed into the housing 14 will suffice as this outlet means. A float 34 is disposed in the chamber 16 and within the second sleeve 20 in cooperative relationship with the orifice seat 32. The weight of the float 34 should be adjusted so that it will open and close at a predetermined height of the denser liquid collected in the chamber 16. Thus, exit of the lighter liquid through the bottom outlet means 30 is effectively precluded. The float 34 preferably comprises a hollow plastic body 34a, a steel cone 34b attached to the bottom of the body, and an opening 34c or other means for introducing a liquid 34d, such as mercury, into the body to adjust the weight of the float 34.

As shown in the drawing, the separator 10 can be conveniently attached to the cell container 12 or other vessel by a hollow bolt 38 which fits across the bottom of the container 12 and screws into the housing 14. This construction is preferred since it permits the liquid outlet means 28 to extend into the cell container 12 and also provides the liquid inlet means 24 without further components. Many other equivalent constructions, however, will be apparent to those in the art.

It was found during operation of the separator of the invention that a vacuum sometimes developed below the orifice seat 32 in the bottom liquid outlet means 30, due to a flow of the dense liquid away from the separator while the float valve 34 was closed. When such occurs, the float valve 34 will tend to remain closed too long. A vent 40 or other means for controlling the pressure below the orifice seat 32 is, therefore, preferably included in the liquid outlet means 30 to prevent such occurrences.

The liquid mixture separator described above has been successfully employed in combination with a sodium amalgam-oxidant fuel cell. The separator removed substantially all of the electrolyte dispersed in the depleted amalgam, and kept harmful amounts of electrolyte from entering the amalgam circulatory system. In addition, the separator, when used in combination with such a cell, reduces the total weight and space of the battery plant as compared with the prior art separator constructions used with an operating fuel cell. Those skilled in the fuel cell art will recognize that any savings of weight and space in the battery plant are quite significant.

What is claimed is:

1. An electrochemical cell comprising an anode, a cathode, an electrolyte, and a liquid mixture separator affixed to said cell for separating said electrolyte from products of the reaction between said electrolyte and said cell electrodes, said electrolyte and said product being immiscible and of different specific gravities and constituting a liquid mixture, said separator comprising a housing having a chamber therein with the bottom central portion of said chamber being the lowest part of said chamber; a liquid inlet and conduit means near the lateral circumference of said chamber for entry of said mixture near the top of said chamber and the conduction of said mixture to a place near the bottom of said chamber, and horizontal flow conduit means connecting said inlet and conduit means near the bottom of said chamber with the central portion of said chamber, thereby permitting said mixture to enter and flow down through said inlet and conduit means and flow substantially horizontally and laminarly through said horizontal flow means to the central portion of said chamber wherein the heavier of said electrolyte and said products settles to the central bottom portion of said chamber; a first liquid outlet means at the top of said chamber for permitting the exit of the lighter of said electrolyte and said products; a second liquid outlet means at the bottom of said chamber near its center for permitting the exit of the heavier of said electrolyte and said products, said second liquid outlet means having an orifice seat therein; and a float disposed within said chamber in cooperative relationship with said orifice seat for maintaining a predetermined amount of the heavier of said electrolyte and said product at the bottom of said chamber.

2. An electrochemical cell and a liquid mixture separator according to claim 1 in which the separator further comprises a first sleeve disposed in said chamber from its top and extending substantially to its bottom, a second sleeve disposed in said chamber from its bottom and within said sleeve and extending toward the top of said chamber to a point above the bottom of said first sleeve, and an inner liquid conduit means between said first sleeve and said second sleeve extending to the top of said second sleeve, said liquid inlet and conduit means being positioned between said housing and said first sleeve, said horizontal flow conduit means being positioned at the bottom of said first sleeve joining said inlet and conduit means with the inner portion of said chamber and being in communication with said inner conduit means.

3. An electrochemical cell and a liquid mixture separator according to claim 2 wherein said conduit means are comprised of a plurality of vertical grooves on the outside surface of said first sleeve in communication with said liquid inlet means, and wherein said inner liquid conduit means are comprised of a plurality of vertical grooves on the outside surface of said second sleeve, with said horizontal flow conduit means connecting each of the vertical grooves on said first sleeve with the inner portion of said chamber and with each of the vertical grooves on said second sleeve.

4. An electrochemical cell and a liquid mixture separator according to claim 2 wherein said first sleeve is spaced from the walls of said chamber to form a first annular space therebetween which comprises said conduit means, and wherein said second sleeve is spaced from said first sleeve to form a second annular space therebetween which comprises said inner liquid conduit means.

5. The separator defined in claim 2 wherein said second sleeve has at least one orifice therein as a part of said horizontal flow conduit means.

6. The separator defined in claim 2 wherein said second outlet means includes a means for controlling the pressure below said orifice seat.

7. The device defined in claim 2 wherein said housing includes at its top connection means for attaching said separator to the bottom of a vessel holding a mixture of two immiscible liquids.

8. The separator defined in claim 2 wherein said float comprises a hollow plastic body, a steel float attached to the bottom of said body, and means for introducing a liquid into said body to adjust the weight of said float.

9. An electrochemical cell comprising an anode, a cathode, an electrolyte, and liquid mixture separator affixed to said cell for separating said electrolyte from products of the reaction between said electrolyte and said cell electrodes, said electrolyte and said products being immiscible and of different specific gravities, said separator comprising a housing having a chamber therein; a first sleeve disposed in said chamber from its top and substantially extending to its bottom; a second sleeve disposed in said chamber from its bottom and within said first sleeve and extending toward the top of said chamber to a point above the bottom of said first sleeve; a plurality of liquid inlet and conduit passages between said housing and said first sleeve along the length of said first sleeve, a corresponding number of inner liquid conduit passages between said first sleeve and said second sleeve and extending to the top of said second sleeve, and a corresponding number of horizontal flow conduit passages at the bottom of said first sleeve joining each inlet and conduit passage with the inner portion of said chamber and providing a substantially horizontal flow of said mixture, and communicating with said inner passages, thereby permitting said mixture to enter and flow through said inlet and conduit passages and then flow substantially horizontally and laminarly through said horizontal flow passages to the inner portion of chamber; a first liquid outlet means at the top of said chamber and communicating with the interior of said first sleeve for permitting the exit of the lighter of said product and said electrolyte; a second liquid outlet means at the bottom of said chamber and within said second sleeve for permitting the exit of the heavier of said product and said electrolyte, said second liquid outlet means having an orifice seat therein; and a float disposed within said chamber and said second sleeve in cooperative relationship with said orifice seat for maintaining a predetermined amount of the heavier liquid at the bottom of said chamber.

10. In combination, a sodium amalgam-oxidant fuel cell comprising a container, an anode and cathode within said container, an electrolyte in said container, means for introducing an oxidant to said cathode, a means for introducing a sodium amalgam to said anode; and a liquid mixture separator attached to the bottom of said container for separating the mixture of sodium amalgam and electrolyte which collects at the bottom of said container, said separator comprising a housing having a chamber therein; a first sleeve disposed in said chamber from its top and substantially extending to its bottom; a second sleeve disposed in said chamber from its bottom and within said first sleeve and extending toward the top of said chamber to a point above the bottom of said first sleeve; a liquid inlet means at the top of said chamber in said housing and communicating with said mixture in the bottom of said container; a first liquid conduit means between said housing and said first sleeve along the length of said first sleeve, said first conduit means communicating with said liquid inlet means; a second liquid conduit means between said first sleeve and said second sleeve and extending to the top of said second sleeve; horizontal flow conduit means at the bottom of said first sleeve joining said first conduit means and the inner portion of said chamber and providing a substantially horizontal flow of said mixture, and communicating with said second conduit means, thereby permitting said mixture to enter through said inlet means, flow down through said first conduit means and then flow substantially horizontally and laminarly through said horizontal flow conduit means to the inner portion of said chamber; electrolyte outlet means at the top of said chamber and communicating with the interior of said first sleeve for permitting the return of electrolyte into said container, said electrolyte outlet means extending into said container to a point above said mixture in the bottom of said container; amalgam outlet means at the bottom of said chamber and within said second sleeve for permitting the exit of said amalgam from said chamber, said amalgam outlet means having an orifice seat therein; and a float disposed within said chamber and said second sleeve in cooperative relationship with said orifice seat for maintaining a predetermined amount of said amalgam at the bottom of said chamber.

11. In combination, the fuel cell and separator defined in claim 10 wherein said second sleeve has at least one orifice therein as a part of said horizontal flow conduit means.

12. In combination, the fuel cell and separator defined in claim 10 wherein said second outlet means includes a means for controlling the pressure below said orifice seat.

13. In combination, the fuel cell and separator defined in claim 10 wherein said float comprises a hollow plastic body, a steel cone attached to the bottom of said body, and means for introducing mercury into the interior of said body to adjust the weight of said float.

No references cited.

WINSTON A. DOUGLAS, *Primary Examiner.*

H. F. FEELEY, *Assistant Examiner.*